US012380586B2

(12) United States Patent
Lee et al.

(10) Patent No.: US 12,380,586 B2
(45) Date of Patent: Aug. 5, 2025

(54) METHOD AND ELECTRONIC DEVICE FOR IDENTIFYING SIZE OF MEASUREMENT TARGET OBJECT

(71) Applicant: GIST(Gwangju Institute of Science and Technology), Gwangju (KR)

(72) Inventors: Kyoobin Lee, Gwangju (KR); Seunghyeok Back, Busan (KR); Sungho Shin, Busan (KR); Raeyoung Kang, Busan (KR); Sangjun Noh, Busan (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 839 days.

(21) Appl. No.: 17/465,650

(22) Filed: Sep. 2, 2021

(65) Prior Publication Data
US 2022/0084234 A1    Mar. 17, 2022

(30) Foreign Application Priority Data

Sep. 17, 2020   (KR) ........................ 10-2020-0119669

(51) Int. Cl.
*G06T 7/62*       (2017.01)
*G06N 3/045*      (2023.01)
(Continued)

(52) U.S. Cl.
CPC ............. *G06T 7/62* (2017.01); *G06N 3/045* (2023.01); *G06N 3/08* (2013.01); *G06T 7/97* (2017.01);
(Continued)

(58) Field of Classification Search
CPC ... G06T 7/62; G06T 7/60; G06T 2207/20081; G06T 2207/20084; G06T 7/73;
(Continued)

(56) References Cited

U.S. PATENT DOCUMENTS 11,257,132 B1*   2/2022  Cornelison ............. G06N 7/01
2018/0260793 A1*  9/2018  Li ......................... G06Q 40/08
(Continued)

FOREIGN PATENT DOCUMENTS

WO    WO-2020035661 A1 *  2/2020 ........... G05D 1/0251

OTHER PUBLICATIONS

Sangjun Noh et al. "Automatic Detection and Identification of Fasteners with Simple Visual Calibration using Synthetic Data" 2020 25th IEEE International Conference on Emerging Technologies and Factory Automation (ETFA), 2020, pp. 38-44, doi: 10.1109/ETFA46521.2020.9212155.

*Primary Examiner* — Manav Seth
(74) *Attorney, Agent, or Firm* — Studebaker Brackett PLLC

(57) ABSTRACT

Provided are a method and electronic device for identifying a size of a measurement target object. The method includes imaging a reference object, which is a reference for identifying the size of the measurement target object, to acquire a reference object image, imaging the measurement target object to acquire a target object image, fusing the acquired reference object image and the acquired target object image, and inputting the fused reference object image and target object image to a first neural network model to acquire size information of the measurement target object from the first neural network model.

6 Claims, 12 Drawing Sheets

(51) Int. Cl.
*G06N 3/08* (2023.01)
*G06T 7/00* (2017.01)
*G06V 20/00* (2022.01)

(52) U.S. Cl.
CPC .... *G06V 20/00* (2022.01); *G06T 2207/20081* (2013.01); *G06T 2207/20084* (2013.01); *G06T 2207/20221* (2013.01)

(58) Field of Classification Search
CPC ... G06T 2207/20221; G06T 5/50; G06T 7/00; G06T 7/174; G06T 7/97; G06T 7/11; G06N 3/08; G06N 3/045; G06N 3/044; G06V 10/82; G06V 20/00; G06V 2201/07; G06V 10/803; G06V 10/77; G06V 10/10; G06V 10/40; G06F 18/214; G06F 18/22; G06F 18/213
See application file for complete search history.

(56) References Cited

U.S. PATENT DOCUMENTS

| | | | |
|---|---|---|---|
| 2019/0102601 A1* | 4/2019 | Karpas | G06V 20/64 |
| 2020/0363791 A1* | 11/2020 | Sakumiya | G05B 19/41865 |
| 2021/0383115 A1* | 12/2021 | Alon | G06Q 30/0276 |

* cited by examiner

METHOD AND ELECTRONIC DEVICE FOR IDENTIFYING SIZE OF MEASUREMENT TARGET OBJECT

CROSS-REFERENCE TO RELATED APPLICATION

This application claims priority to and the benefit of Korean Patent Application No. 2020-0119669, filed on Sep. 17, 2020, the disclosure of which is incorporated herein by reference in its entirety.

BACKGROUND

1. Field of the Invention

The present disclosure relates to a device and method for identifying a size of a target object, and more particularly, to a device and method for identifying size of a target object using a neural network.

2. Discussion of Related Art

With the development of camera devices and display devices, vigorous research is underway on technologies for identifying the shape or size of an object in an image output through a display device. In particular, there are increasing attempts to reduce a defect rate and increase a yield of normal products by analyzing a product image through an image analysis technology in a mass product manufacturing process and detecting a flaw of the product through the analysis result of the product image. Such an image analysis technology is used in various industrial fields such as product classification and inspection.

Generally, according to a related art, a distance sensor is used to estimate actual distance information from an image, or a reference object is imaged together with a measurement target object in order to measure size of the measurement target object. Also, it is necessary to acquire characteristic information (e.g., a focal length) of a camera and the like in advance.

Therefore, it is necessary to develop a technology for accurately identifying size of a measurement target product without imaging a reference object together with the measurement target product or acquiring characteristic information of a camera in advance.

SUMMARY OF THE INVENTION

The present disclosure is directed to providing a method of identifying size of a measurement target object and an electronic device for performing the method.

More specifically, the present disclosure is directed to providing a method and device for identifying size of a measurement target object in an image using an artificial neural network.

According to an aspect of the present disclosure, there is provided a method of identifying a size of a measurement target object by an electronic device, the method including imaging a reference object, which is a reference for identifying the size of the measurement target object, to acquire a reference object image, imaging the measurement target object to acquire a target object image, fusing the acquired reference object image and the acquired target object image, and inputting the fused reference object image and target object image to a first neural network model to acquire size information of the measurement target object from the first neural network model.

The method may further include inputting the target object image to a second neural network model to acquire a target object mask image generated on the basis of a target object area in the target object image from the second neural network model, and the fusing of the acquired reference object image and target object image may include fusing the target object mask image and the reference object image.

According to another aspect of the present disclosure, there is provided an electronic device for identifying a size of a measurement target object, the electronic device including a memory configured to store one or more instructions and at least one processor configured to execute the one or more instructions. The at least one processor executes the one or more instructions so that a reference object, which is a reference for identifying size of the measurement target object, is imaged to acquire a reference object image, the measurement target object is imaged to acquire a target object image, the acquired reference object image and the acquired target object image are fused, and the fused reference object image and target object image is input to a first neural network model to acquire size information of the measurement target object from the first neural network model.

According to another aspect of the present disclosure, there is provided a computer-readable recording medium in which a program for performing a method of identifying a size of a measurement target object by an electronic device is stored, wherein the method includes imaging a reference object, which is a reference for identifying the size of the measurement target object, to acquire a reference object image, imaging the measurement target object to acquire a target object image, fusing the acquired reference object image and the acquired target object image, and inputting the fused reference object image and target object image to a first neural network model to acquire size information of the measurement target object from the first neural network model.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
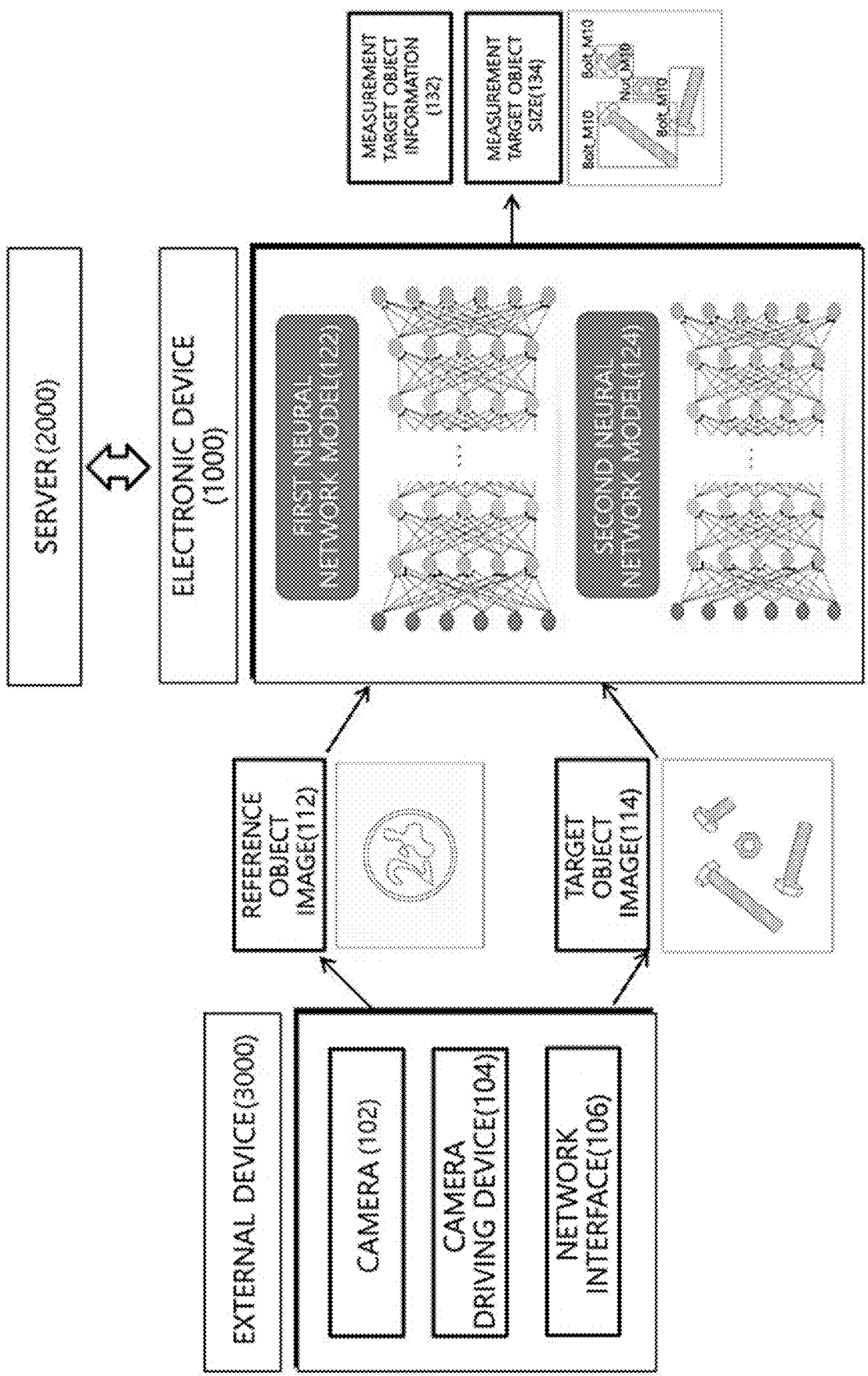
FIG. 1 is a diagram schematically showing a process in which an electronic device identifies size of a measurement target object according to an exemplary embodiment.

Terminology used herein will be briefly described, and then the present disclosure will be described in detail.

Although general terms widely used at present are selected in consideration of the functions in the present disclosure, these terms may vary according to intentions of those of ordinary skill in the art, precedents, the advent of new technologies, or the like. Terms arbitrarily selected by the applicant may be used in a specific case. In this case, their meanings will be given in the detailed description of the present disclosure. Accordingly, the terms used in the present disclosure should not be simply defined on the basis of their names but defined on the basis of their meanings and the content of the entire specification.

Throughout the specification, when a part is referred to as "including" an element, the part may additionally include another element and does not preclude another element unless particularly stated otherwise. Also, a term, such as " . . . unit" or "module," used herein represents a unit for processing at least one function or operation and may be implemented as hardware, software, or a combination of hardware and software.

Hereinafter, exemplary embodiments of the present disclosure will be described in detail with reference to the accompanying drawings so that the exemplary embodiments can be easily implemented by those of ordinary skill in the art to which the present disclosure pertains. However, the present disclosure may be embodied in many different forms and is not limited to the exemplary embodiments set forth herein. In the drawings, parts irrelevant to the description are omitted to clearly describe the present disclosure. Throughout the specification, like reference numerals refer to like elements.

FIG. 1 is a diagram schematically showing a process in which an electronic device identifies size of a measurement target object according to an exemplary embodiment.

According to an exemplary embodiment, an electronic device 1000 may acquire a reference object image 112 and a target object image 114 from an external device 3000 and analyze the acquired reference object image 112 and target object image 114 to identify a size 134 of a measurement target object in the target object image 114. According to an exemplary embodiment, the electronic device 1000 may identify the size 134 of the measurement target object as one piece of measurement target object information 132 by analyzing the target object image 114. According to an exemplary embodiment, the external device 3000 may be a camera device for imaging a reference object or the measurement target object.

Although FIG. 1 shows that the electronic device 1000 receives the reference object image 112 and the target object image 114 from the external device 3000, according to another exemplary embodiment, the electronic device 1000 may include at least one camera and directly acquire the reference object image 112 and the target object image 114. According to an exemplary embodiment, the reference object image 112 may be an image generated by imaging a reference object, and the target object image 114 may be an image generated by imaging a measurement target object. According to an exemplary embodiment, the target object image 114 may include an image of at least one measurement target object.

According to an exemplary embodiment, the electronic device 1000 may include at least one neural network model. According to an exemplary embodiment, the electronic device 1000 may include a first neural network model 122 and a second neural network model 124. The electronic device 1000 may analyze the reference object image 112 and the target object image 114 using at least one of the above-described neural network models, thereby identifying the size 134 of the measurement target object in the target object image 114.

Although FIG. 1 shows that the electronic device 1000 identifies size of a measurement target object, according to another exemplary embodiment, the electronic device 1000 may identify not only size of a measurement target object but also the type of measurement target object and an object area in which the measurement target object is present in the target object image 114.

According to an exemplary embodiment, the electronic device 1000 may be implemented in various forms. For example, the electronic device 1000 described herein may be a digital camera, a mobile terminal, a smart phone, a laptop computer, a tablet personal computer (PC), an e-book terminal, a digital broadcast terminal, a personal digital assistant (PDA), a portable multimedia player (PMP), a navigation device, a Moving Picture Experts Group (MPEG) Audio Layer III (MP3) player, or the like, but the electronic device 1000 is not limited thereto.

According to an exemplary embodiment, the external device 3000 may include a camera 102, a camera driving device 104, and a network interface 106. However, the external device 3000 is not limited thereto and may further include other devices for capturing an image of an object and transmitting information on the captured image to the electronic device 1000. According to an exemplary embodiment, the external device 3000 may be a camera device, a still image capturing device, or a video capturing device including at least one camera.

According to an exemplary embodiment, the camera 102 may include at least one image sensor and generate an image by sensing light reflected by an object through the image sensor. The camera driving device 104 may control the position or attitude of the camera 102. The network interface 106 may transmit, to the electronic device 1000, information on the object that the external device 300 acquires by imaging the object.

According to an exemplary embodiment, the electronic device 1000 may identify size of a measurement target object in a target object image by interoperating with a server 2000. According to an exemplary embodiment, the server 2000 may be connected to the external device 3000 to acquire the reference object image 112 and the target object image 114 and transmit information on the acquired reference object image 112 and target object image 114 to the electronic device 1000.

According to an exemplary embodiment, the server 2000 may include other computing devices that may communicate with the electronic device 1000, which measures size of a measurement target object, through a network to exchange data with the electronic device 1000. According to an exemplary embodiment, the network includes a local area network (LAN), a wide area network (WAN), a value added network (VAN), a mobile radio communication network, a satellite communication network, and combinations thereof. The network is a comprehensive data communication network which allows the network components shown in FIG. 1 to smoothly communicate with each other and may include a wired Internet, a wireless Internet, and a mobile wireless communication network.

Figure 2:
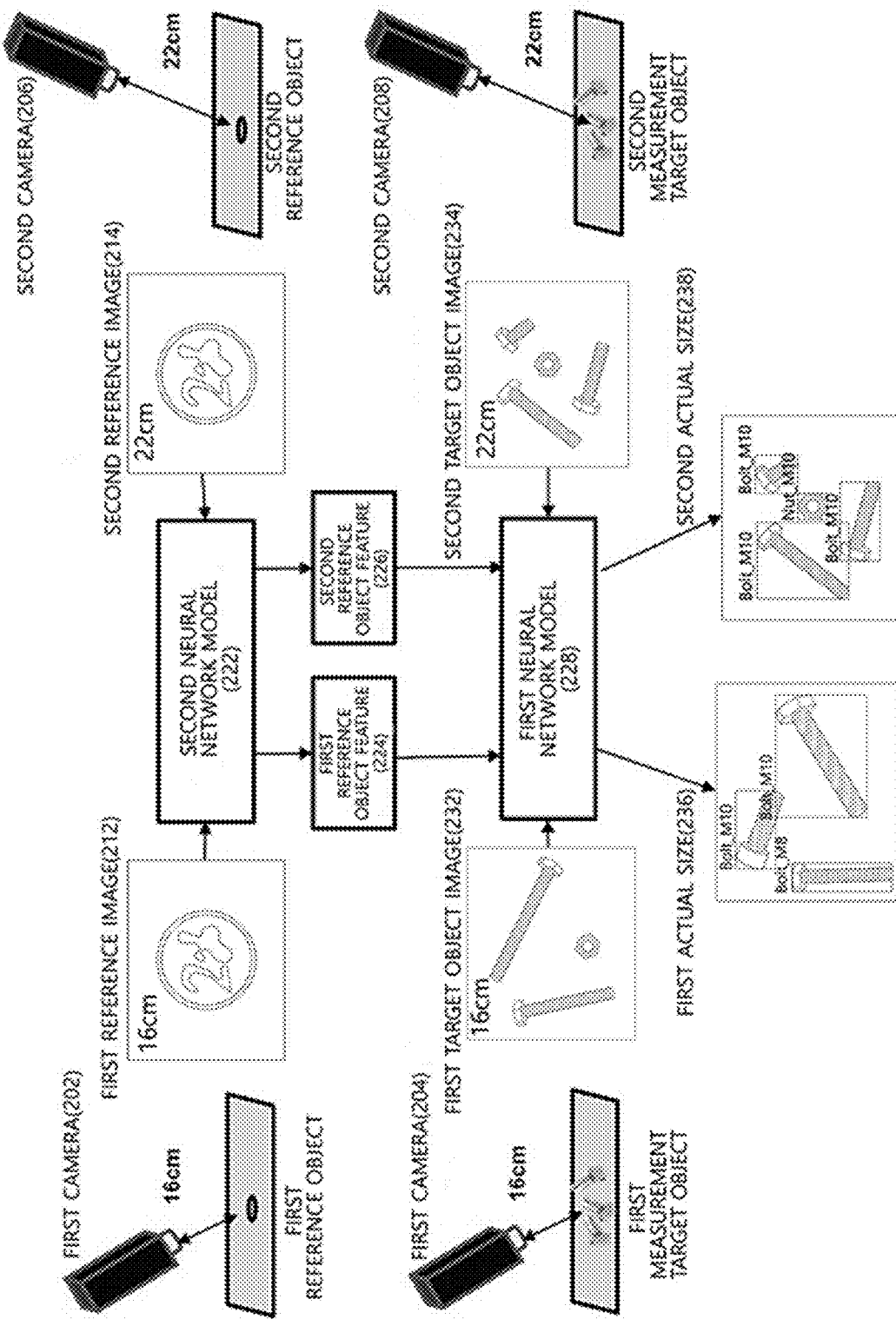
FIG. 2 is a diagram showing a process in which an electronic device identifies size of a measurement target object according to another exemplary embodiment.

FIG. 2 is a diagram showing a process in which an electronic device identifies size of a measurement target object according to another exemplary embodiment.

Referring to FIG. 2, a process in which the electronic device 1000 identifies size of a measurement target object will be described. According to an exemplary embodiment, the electronic device 1000 may be connected to a first camera 202 or a second camera 206 which is fixed at a different attitude than the first camera 202. According to an exemplary embodiment, the first camera 202 and the second camera 206 may be set to different attitudes at different positions. Also, according to an exemplary embodiment, the first camera 202 and the second camera 206 may be different cameras or may be the same camera that is different only in attitude.

According to an exemplary embodiment, the electronic device 1000 may acquire a first reference image 212 from the first camera 202 and input the acquired first reference image 212 to a second neural network model 222. The electronic device 1000 may acquire a first reference object feature 224 corresponding to the first reference image 212 from the second neural network model 222 and input the acquired first reference object feature 224 to a first neural network model 228.

According to an exemplary embodiment, the electronic device 1000 may input a first target object image 232, which is acquired by imaging a first measurement target object through a first camera 204, to the first neural network model 228. The electronic device 1000 may input the first target object image 232 to the first neural network model 228 together with the first reference object feature 224. The electronic device 1000 may acquire information on a first actual size 236 of the measurement target object in the first target object image 232 from the first neural network model 228. According to an exemplary embodiment, the first camera 202 may be a camera which has the same attitude at the same position as the first camera 204.

According to another exemplary embodiment, the electronic device 1000 may acquire a second reference image 214 from the second camera 206 and input the acquired second reference image 214 to the second neural network model 222. The electronic device 1000 may acquire a second reference object feature 226 corresponding to the second reference image 214 from the second neural network model 222 and input the acquired second reference object feature 226 to the first neural network model 228.

According to an exemplary embodiment, the electronic device 1000 may input a second target object image 234, which is acquired by imaging a second measurement target object through a second camera 208, to the first neural network model 228. The electronic device 1000 may input the second target object image 234 to the first neural network model 228 together with the second reference object feature 226. The electronic device 1000 may acquire information on a second actual size 238 of the measurement target object in the second target object image 234 from the first neural network model 228.

According to an exemplary embodiment, the second camera 206 may be a camera which has the same attitude at the same position as the second camera 208.

Figure 3:
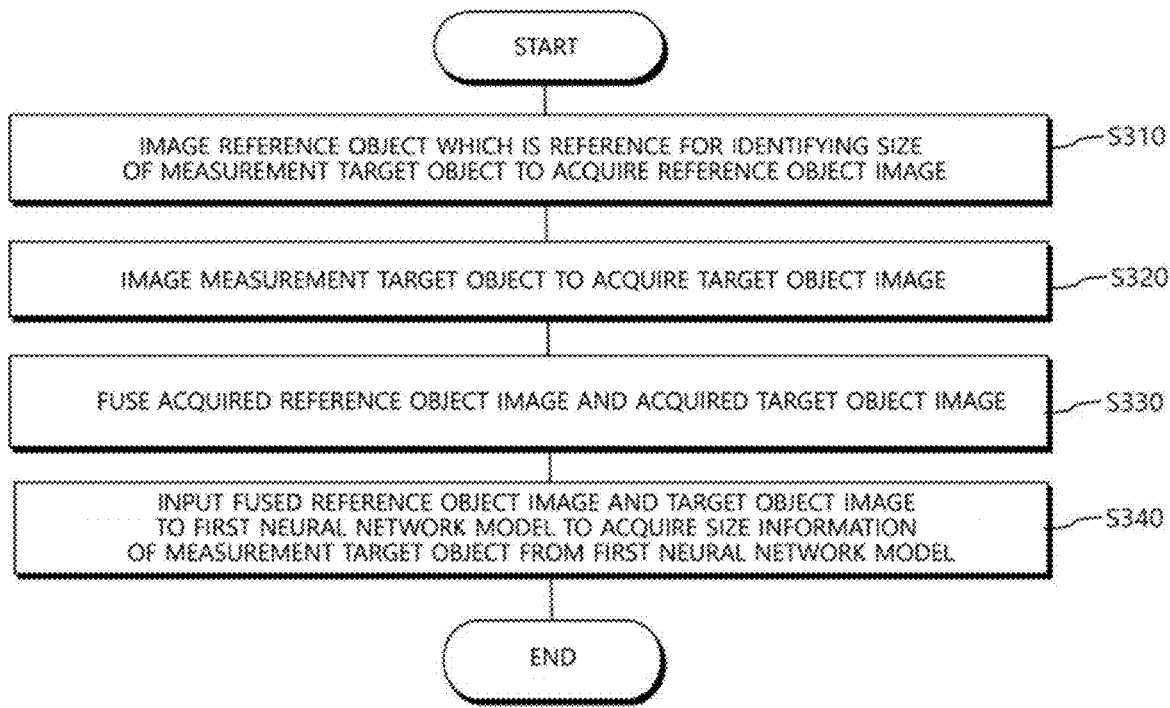
FIG. 3 is a flowchart of a method in which an electronic device identifies size of a measurement target object according to an exemplary embodiment.

FIG. 3 is a flowchart of a method in which an electronic device identifies size of a measurement target object according to an exemplary embodiment.

In operation S310, the electronic device 1000 may acquire a reference object image by imaging a reference object which is a reference for identifying size of a measurement target object. According to an exemplary embodiment, the electronic device 1000 may receive the reference object image, which is acquired by imaging the reference object, from a camera device connected thereto.

In operation S320, the electronic device 1000 may acquire a target object image by imaging the measurement target object. According to an exemplary embodiment, the electronic device 1000 may acquire the target object image, which is acquired by imaging the measurement target object, from a camera connected to thereto.

In operation S330, the electronic device 1000 may fuse the reference object image and the target object image. For example, the electronic device 1000 may fuse the reference object image and the target object image by applying image information of the reference object shown in the reference object image to the target object image. According to another exemplary embodiment, the electronic device 1000 may acquire a target object mask image which may be generated by inputting the target object image to a second neural network model and fuse the acquired target object mask image and the reference object image.

According to an exemplary embodiment, the electronic device 1000 may fuse the reference object image and the target object image by applying the reference object image information to the target object image or may fuse the reference object image and the target object image in units of certain channels.

In operation S340, the electronic device 1000 may acquire size of the measurement target object from a first neural network model by inputting the fused reference object image and target object image to the first neural network model.

According to another exemplary embodiment, the electronic device 1000 may acquire size information of the measurement target object by inputting the fused target object mask image and reference object image to the first neural network model.

According to an exemplary embodiment, the first neural network model and the second neural network model used by the electronic device 1000 may include a deep neural network (DNN). For example, the first neural network model and the second neural network model may be convolutional neural networks (CNNs), DNNs, recurrent neural networks (RNNs), restricted Boltzmann machines (RBMs), deep belief networks (DBNs), bidirectional recurrent deep neural networks (BRDNNs), deep Q-networks, or the like but are not limited thereto.

Figure 4:
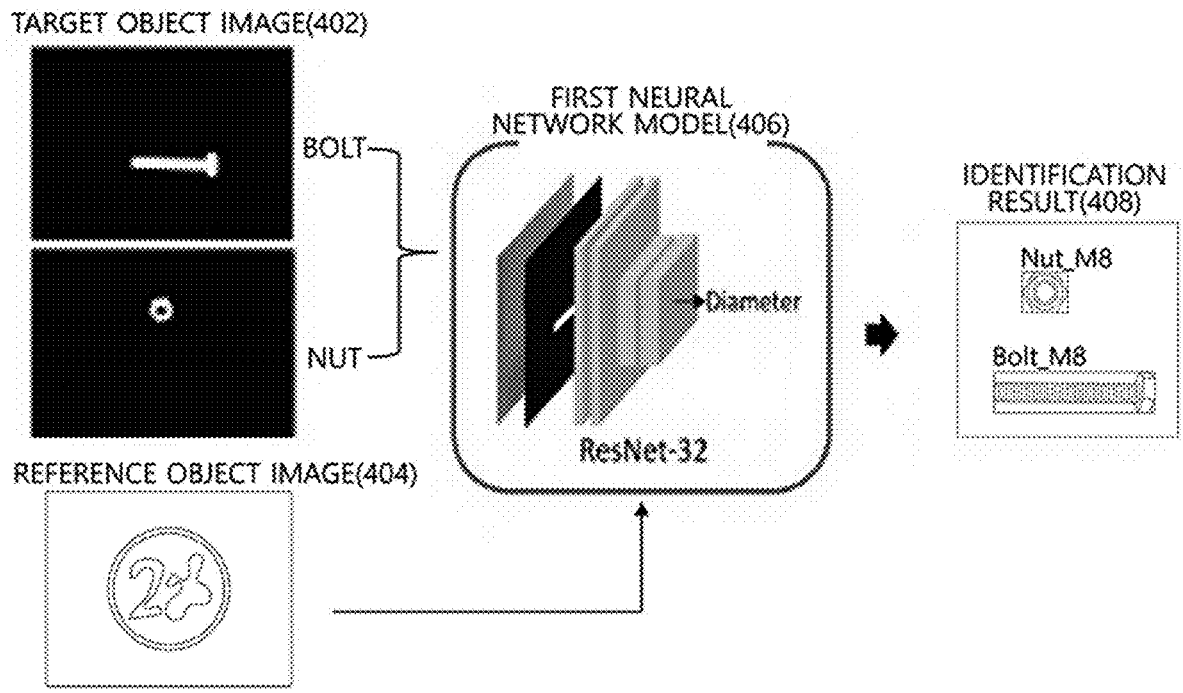
FIG. 4 is a diagram illustrating a first neural network model which is used by an electronic device to identify size of a target object according to an exemplary embodiment.

FIG. 4 is a diagram illustrating a first neural network model which is used by an electronic device to identify size of a target object according to an exemplary embodiment.

According to an exemplary embodiment, the electronic device 1000 may acquire size information of a measurement target object in a target object image 402 as an identification result 408 using a first neural network model 406. For example, the electronic device 1000 may acquire the target object image 402 by imaging the measurement target object and acquire a reference object image 404 by imaging a reference object. The electronic device 1000 may input the target object image 402 and the reference object image 404 to the first neural network model 406.

According to another exemplary embodiment, the electronic device 1000 may acquire a target object mask image, which is a binary image, on the basis of an object area in the target object image 402 by inputting the target object image 402 to the second neural network model and then input the target object mask image and the reference object image 404 to the first neural network model 406.

According to an exemplary embodiment, the first neural network model 406 is a DNN and may be a neural network having a ResNet-32 structure. However, the first neural network model 406 is not limited thereto. According to an exemplary embodiment, the first neural network model 406 may be trained in advance to output information of a measurement target object in a target object image when the target object image and a reference object image are input. According to an exemplary embodiment, the first neural network model 406 may include an object size identification network which acquires the target object mask image and the reference object image 404, compares the acquired target object mask image and reference object image 404, and outputs information on the type and size of the measurement target object, which is represented by an object box in an image including the measurement target object, on the basis of the comparison result.

According to an exemplary embodiment, the first neural network model 406 may further output information on a type of the measurement target object and an area, which is represented by the measurement target object in the target object image 402, in addition to the size of the measurement target object. The electronic device 1000 may acquire information on the size, type, or area of the measurement target object as an identification result in the target object image 402 on the basis of the output value of the first neural network model 406.

Figure 5:
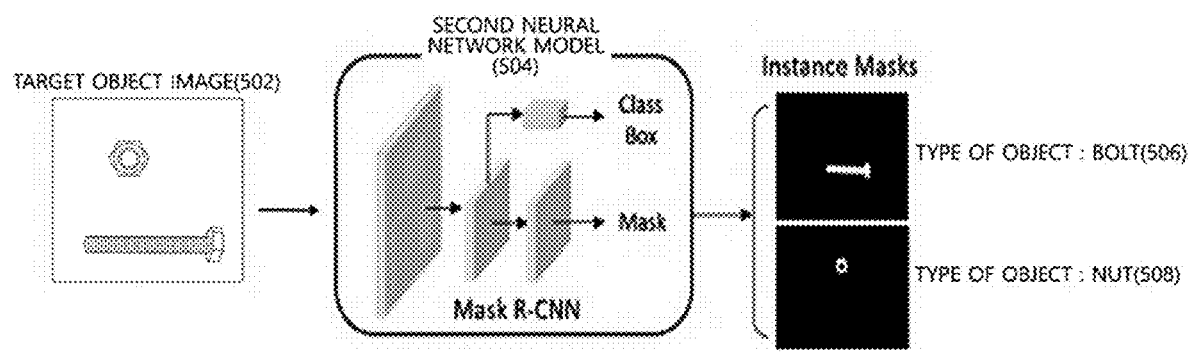
FIG. 5 is a diagram illustrating a second neural network model which is used by an electronic device to identify size of a target object according to an exemplary embodiment.

FIG. 5 is a diagram illustrating a second neural network model which is used by an electronic device to identify size of a target object according to an exemplary embodiment.

According to an exemplary embodiment, the electronic device 1000 may acquire at least one target object mask image using a second neural network model 504. For example, the electronic device 1000 may acquire one or more target object mask images 506 and 508 by acquiring a target object image 502 and inputting the acquired target object image 502 to the second neural network model 504. According to an exemplary embodiment, the second neural network model 504 may be a mask region based (R)-CNN but is not limited thereto.

According to an exemplary embodiment, the second neural network model 504 may include an object detection network. The object detection network identifies an object area including each of one or more measurement target objects in the target object image 502, which is input to the second neural network model 504 and includes the at least measurement target object, generates an object box including the object area, identifies the type of measurement target object represented by the object box, and binarizes an image input to the second neural network model 504 on the basis of the object area to generate the target object mask image.

According to an exemplary embodiment, by using the second neural network model 504, the electronic device 1000 may identify the boundary of an object area on the basis of pixel values in the target object image 502, identify an object area on the basis of the identified boundary, and binarize the identified object area and the target object image excluding the object area to generate a target object mask image. The electronic device 1000 may acquire size information of the measurement target object by fusing the generated target object mask image and a reference object image and inputting the fused image to a first neural network model.

Figure 6:
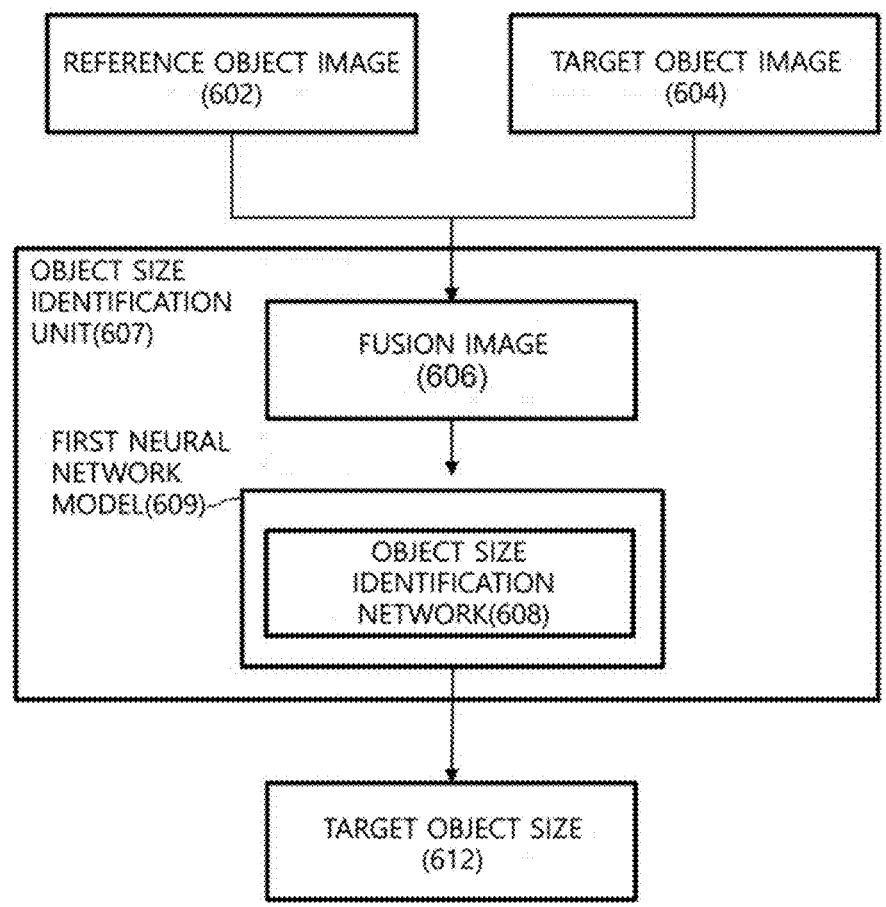
FIG. 6 is a diagram illustrating a process in which an electronic device identifies size of a target object according to an exemplary embodiment.

FIG. 6 is a diagram illustrating a process in which an electronic device identifies size of a target object according to an exemplary embodiment.

Referring to FIG. 6, a process in which the electronic device 1000 identifies size of a target object will be described in brief. The electronic device 1000 may acquire a reference object image 602 and a target object image 604 and fuse the acquired reference object image 602 and target object image 604 to generate a fusion image 606. According to another exemplary embodiment, the electronic device 1000 may fuse a target object mask image generated by masking a target object image and a reference object image.

The electronic device 1000 may input the fusion image 606 to a first neural network model 609. According to an exemplary embodiment, the electronic device 1000 may transfer the fusion image 606 to an object size identification network 608 in the first neural network model 609. The electronic device 1000 may identify a size 612 of a target object in the target object image 604 on the basis of an output value of the first neural network model 609. According to an exemplary embodiment, the electronic device 1000 may include an object size identification unit 607. Using the object size identification unit 607, the electronic device 1000 may fuse the reference object image 602 and the target object image 604 and input the fusion image 606 generated as a result of fusion to the object size identification network 608.

Figure 7:
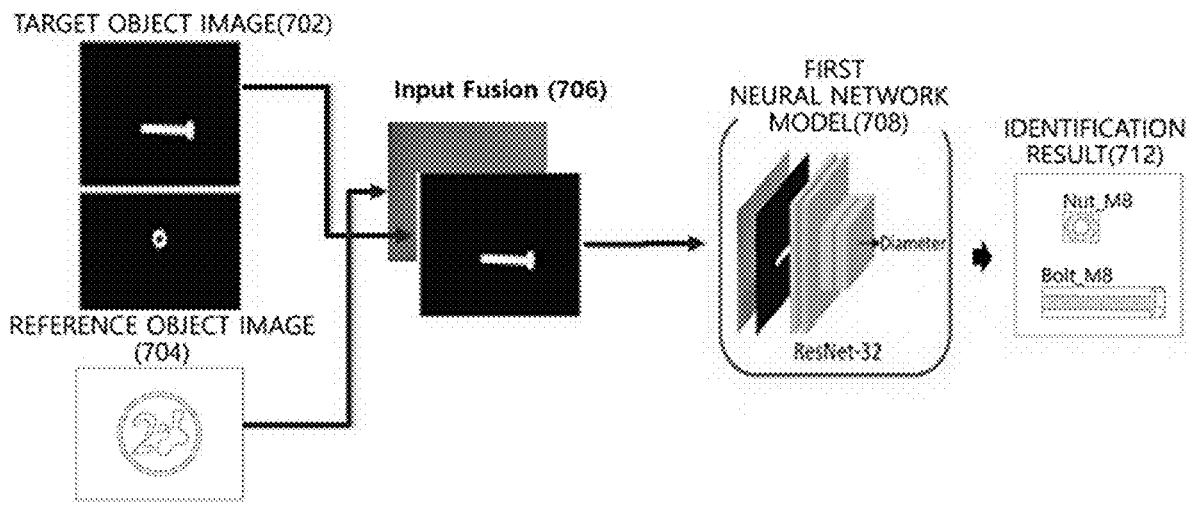
FIG. 7 is a diagram illustrating a process in which an electronic device fuses a target object image and a reference object image at an input level according to an exemplary embodiment.

FIG. 7 is a diagram illustrating a process in which an electronic device fuses a target object image and a reference object image at an input level according to an exemplary embodiment.

The electronic device 1000 according to the present disclosure may fuse information on a target object image and information on a reference object image at various levels. According to an exemplary embodiment, referring to FIG. 7, the electronic device 1000 may fuse a target object image 702 and a reference object image 704 at an image level before the target object image 702 and the reference object image 704 are input to a first neural network model 708. The electronic device 1000 may acquire size information of a measurement target object as an identification result 712 by inputting the fused target object image 702 and reference object image 704 to the first neural network model 708.

According to another exemplary embodiment, the electronic device 1000 may fuse a target object mask image, which is acquired from a second neural network model by inputting the target object image 702 to the second neural network model, with the reference object image 704 and input a fusion image generated as a result of fusion to the first neural network model 708.

Figure 8:
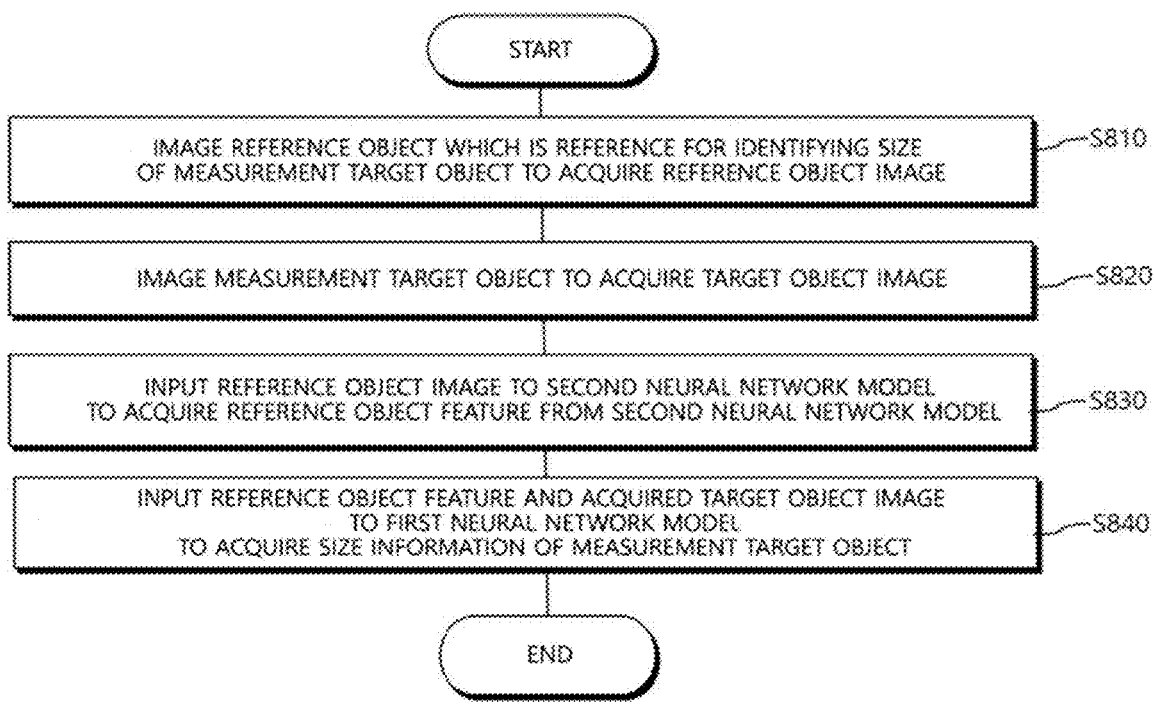
FIG. 8 is a flowchart of a method in which an electronic device identifies size of a target object according to another exemplary embodiment.

FIG. 8 is a flowchart of a method in which an electronic device identifies size of a target object according to another exemplary embodiment.

In operation S810, the electronic device 1000 may acquire a reference object image by imaging a reference object which is a reference for identifying size of a measurement target object. Since operation S810 may correspond to operation S310 of FIG. 3, a detailed description thereof is omitted. In operation S820, the electronic device 1000 may acquire a target object image by imaging the measurement target object. Since operation S820 may correspond to operation S320 of FIG. 3, a detailed description thereof is omitted.

In operation S830, the electronic device 1000 may acquire a reference object feature from a second neural network model by inputting the reference object image to the second neural network model. According to an exemplary embodiment, the reference object feature is an output value of a network layer in the second neural network model and may be a vector sequence of a specific layer. According to an exemplary embodiment, the reference object feature is an output value of the network layer in the second neural network model and may be a vector sequence of hidden layer vectors.

In operation S840, the electronic device 1000 may acquire size information of the measurement target object by inputting the reference object feature and the target object image to a first neural network model.

Figure 9:
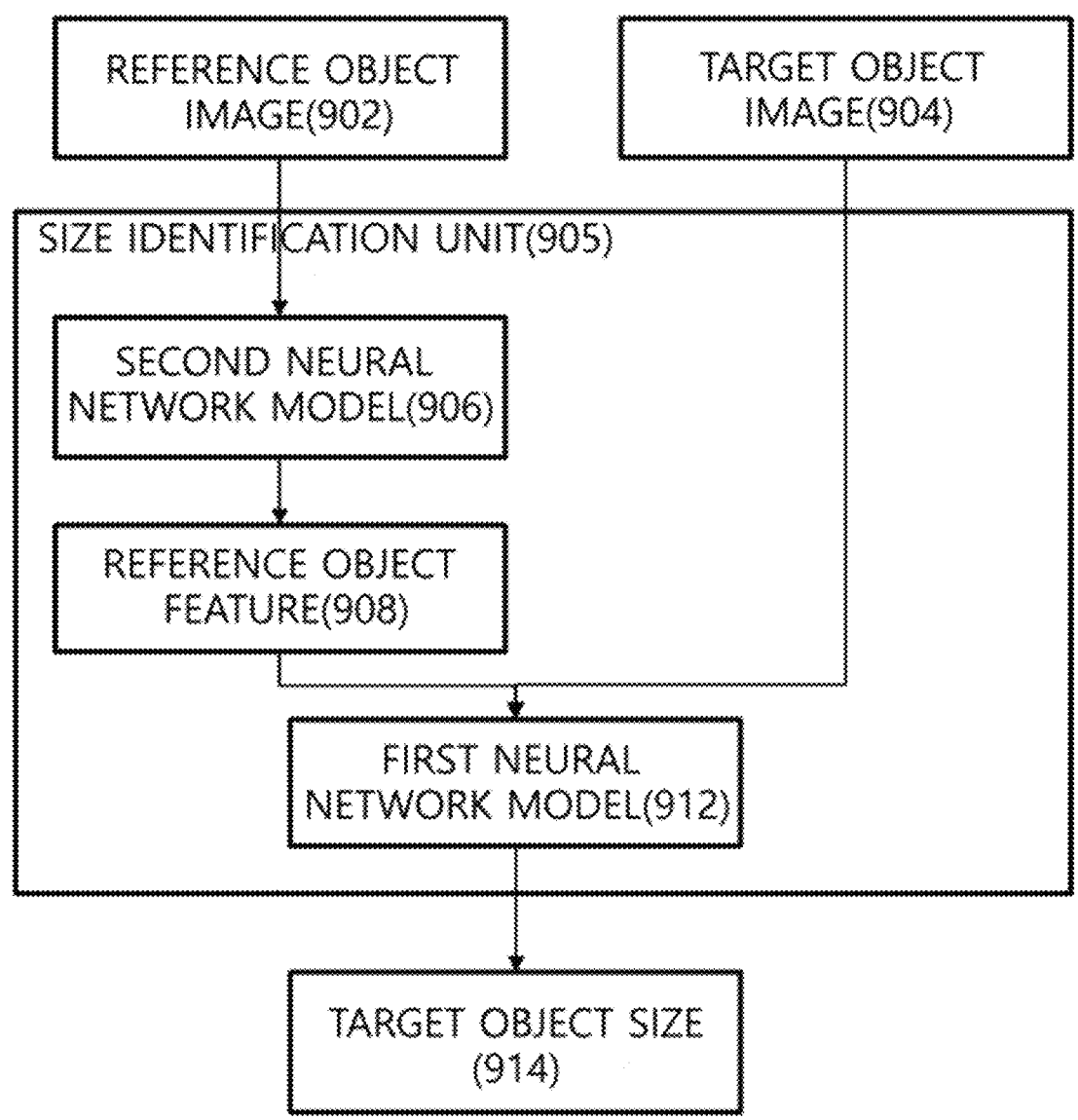
FIG. 9 is a diagram illustrating a process in which an electronic device identifies size of a target object according to another exemplary embodiment.

FIG. 9 is a diagram illustrating a process in which an electronic device identifies size of a target object according to another exemplary embodiment.

Referring to FIG. 9, another process in which the electronic device 1000 identifies size of a target object will be described in brief. The electronic device 1000 may acquire a reference object image 902 and a target object image 904 and acquire a reference object feature 908 by inputting the acquired reference object image 902 to a second neural network model 906. The electronic device 1000 may acquire information on a target object size 914 by inputting the reference object feature 908 and the target object image 904 to a first neural network model 912. According to an exemplary embodiment, an operation in which the electronic device 1000 inputs the reference object image 902 and the target object image 904 to the second neural network model 906, acquires the reference object feature 908 from the second neural network model 906, and inputs the acquired reference object feature 908 and the target object image 904 to the first neural network model 912 may be performed by a size identification unit 905 in the electronic device 1000.

Figure 10:
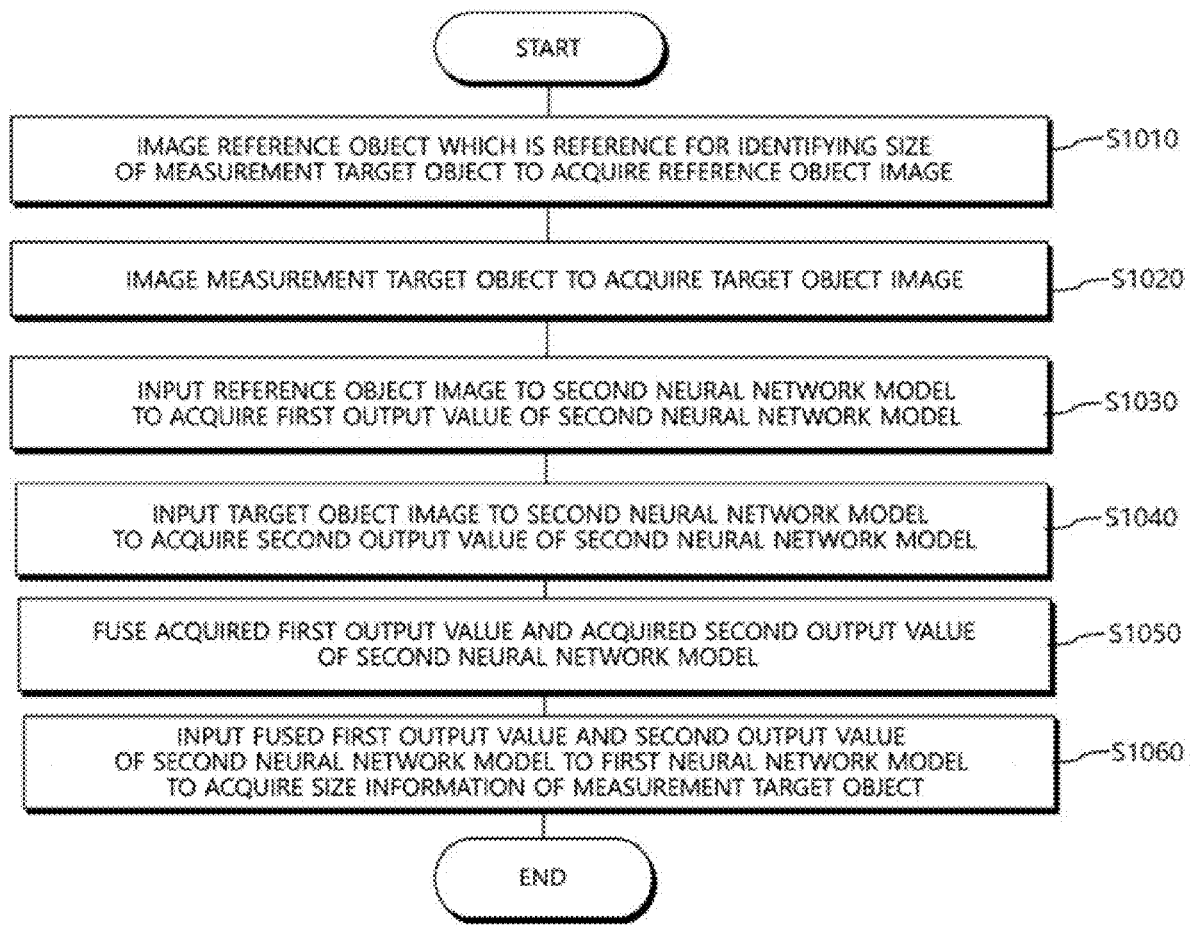
FIG. 10 is a flowchart of a method in which an electronic device identifies size of a target object according to another exemplary embodiment.

FIG. 10 is a flowchart of a method in which an electronic device identifies size of a target object according to another exemplary embodiment.

In operation S1010, the electronic device 1000 may acquire a reference object image by imaging a reference object which is a reference for identifying size of a measurement target object. Since operation S1010 may correspond to operation S310 of FIG. 3, a detailed description thereof is omitted. In operation S1020, the electronic device 1000 may acquire a target object image by imaging the measurement target object. Since operation S1020 may correspond to operation S320 of FIG. 3, a detailed description thereof is omitted.

In operation S1030, the electronic device 1000 may acquire a first output value of a second neural network model by inputting the reference object image to the second neural network model. According to an exemplary embodiment, the electronic device 1000 may acquire a vector sequence, which is output from an output layer of the second neural network model when the reference object image is input to the second neural network model, as the first output value of the second neural network model. According to another exemplary embodiment, the electronic device 1000 may acquire a vector sequence, which is output from one layer selected in the second neural network model when the reference object image is input to the second neural network model, as the first output value of the second neural network model.

In operation S1040, the electronic device 1000 may acquire a second output value of the second neural network model by inputting the target object image to the second neural network model. According to an exemplary embodiment, the electronic device 1000 may acquire a vector sequence, which is output from the output layer of the second neural network model when the target object image is input to the second neural network model, as the second output value of the second neural network model. According to another exemplary embodiment, the electronic device 1000 may acquire a vector sequence, which is output from one layer selected in the second neural network model when the target object image is input to the second neural network model, as the second output value of the second neural network model.

In operation S1050, the electronic device 1000 may fuse the first output value and the second output value of the second neural network model. According to an exemplary embodiment, the electronic device 1000 may fuse the first output value and the second output value of the second neural network model by averaging the first output value and the second value. According to another exemplary embodiment, when each of the first output value and the second output value is an output value of a Softmax layer in the second neural network model, the electronic device 1000 may fuse the first output value and the second output value by averaging the output values of the Softmax layer.

In operation S1060, the electronic device 1000 may acquire size information of the measurement target object by inputting the fused first output value and second output value of the second neural network model to a first neural network model.

Figure 11:
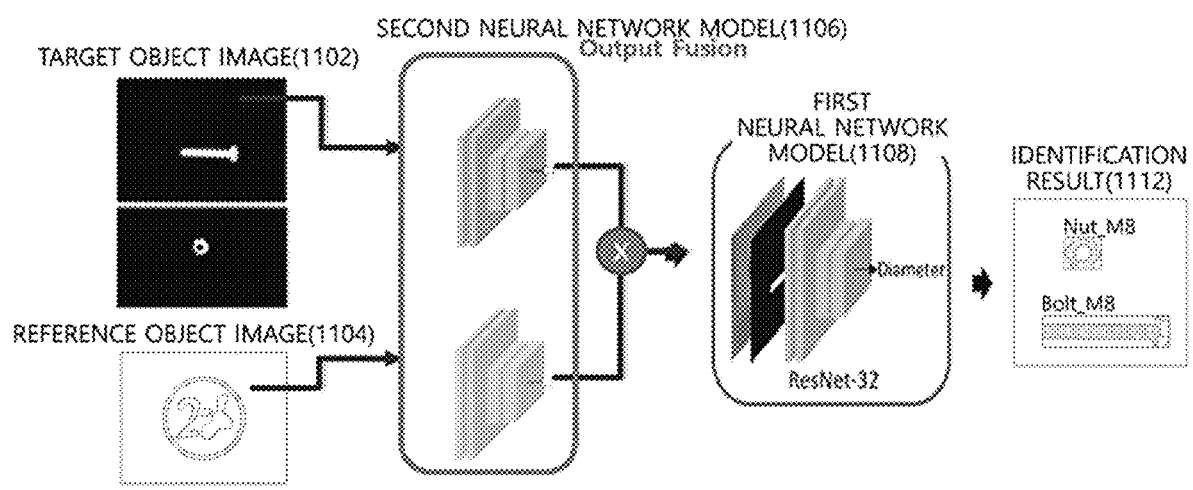
FIG. 11 is a diagram showing a process in which an electronic device fuses an output value of a second neural network model, which is output when a target object image is input to the second neural network model, and an output value of the second neural network model, which is output when a reference object image is input to the second neural network model, at an output value level of a neural network model according to another exemplary embodiment.

FIG. 11 is a diagram showing a process in which an electronic device fuses an output value of a second neural network model, which is output when a target object image is input to the second neural network model, and an output value of the second neural network model, which is output when a reference object image is input to the second neural network model, at an output value level of a neural network model according to another exemplary embodiment.

The process in which the electronic device 1000 identifies size of a target object described above with reference to FIG.

10 will be described in brief with reference to FIG. 11. According to an exemplary embodiment, the electronic device 1000 may acquire a first output value and a second output value of a second neural network model 1106 respectively corresponding to a target object image 1102 and a reference object image 1104 by inputting the target object image 1102 and the reference object image 1104 to the second neural network model 1106.

The electronic device 1000 may acquire a fused output value by fusing the above-described first and second output values of the second neural network model at an output unit level of the second neural network model and acquire size information of a measurement target object as an identification result 1112 by inputting the acquired fused output value to a first neural network model 1108.

The electronic device 1000 according to the present disclosure may fuse the first output value and the second output value of the second neural network model respectively corresponding to the target object image 1102 and the reference object image 1104 by executing an output fusion algorithm at an output layer level of the second neural network model.

Figure 12:
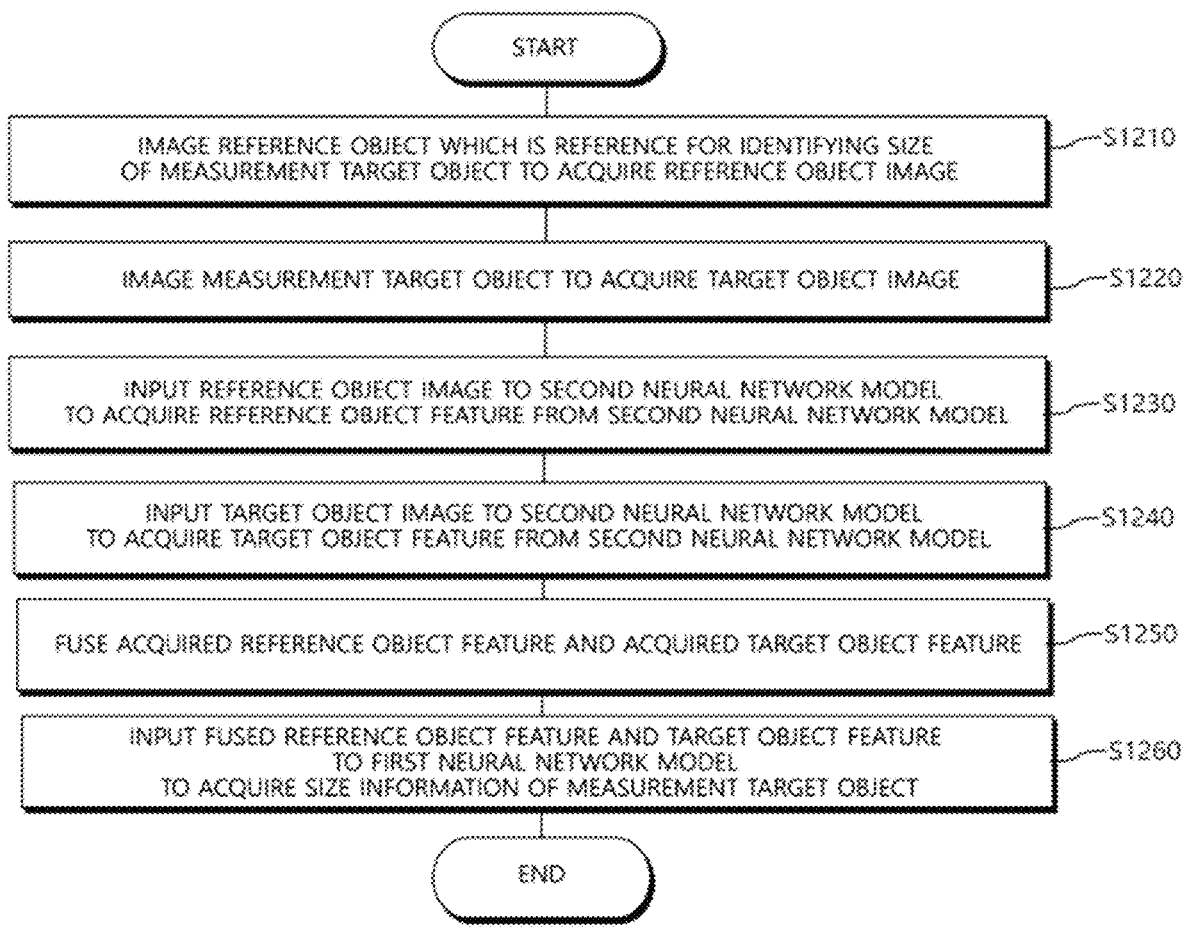
FIG. 12 is a flowchart of a method in which an electronic device identifies size of a target object according to another exemplary embodiment.

FIG. 12 is a flowchart of a method in which an electronic device identifies size of a target object according to another exemplary embodiment.

In operation S1210, the electronic device 1000 may acquire a reference object image by imaging a reference object which is a reference for identifying size of a measurement target object. Since operation S1210 may correspond to operation S310 of FIG. 3, a detailed description thereof is omitted. In operation S1220, the electronic device 1000 may acquire a target object image by imaging the measurement target object. Since operation S1220 may correspond to operation S320 of FIG. 3, a detailed description thereof is omitted.

In operation S1230, the electronic device 1000 may acquire a reference object feature from a second neural network model by inputting the reference object image to the second neural network model. For example, the electronic device 1000 may acquire a vector sequence output from at least one layer in the second neural network model as a reference object feature by inputting the reference object image to the second neural network model. According to an exemplary embodiment, the reference object feature may be generated in the form of a vector including a certain sequence.

In operation S1240, the electronic device 1000 may acquire a target object feature from the second neural network model by inputting the target object image to the second neural network model. For example, the electronic device 1000 may acquire a vector sequence output from at least one layer in the second neural network model as a target object feature by inputting the target object image to the second neural network model. According to an exemplary embodiment, the target object feature may be generated in the form of a vector including a certain sequence.

In operation S1250, the electronic device 1000 may fuse the acquired reference object feature and target object feature. For example, the electronic device 1000 may fuse the reference object feature and the target object feature by performing element-wise addition of the reference object feature and the target object feature. According to another exemplary embodiment, the electronic device 1000 may fuse the acquired reference object feature and target object feature by concatenating the reference object feature and the target object feature in units of channels.

In operation S1260, the electronic device 1000 may acquire size information of the measurement target object by inputting the fused reference object feature and target object feature to a first neural network model.

Figure 13:
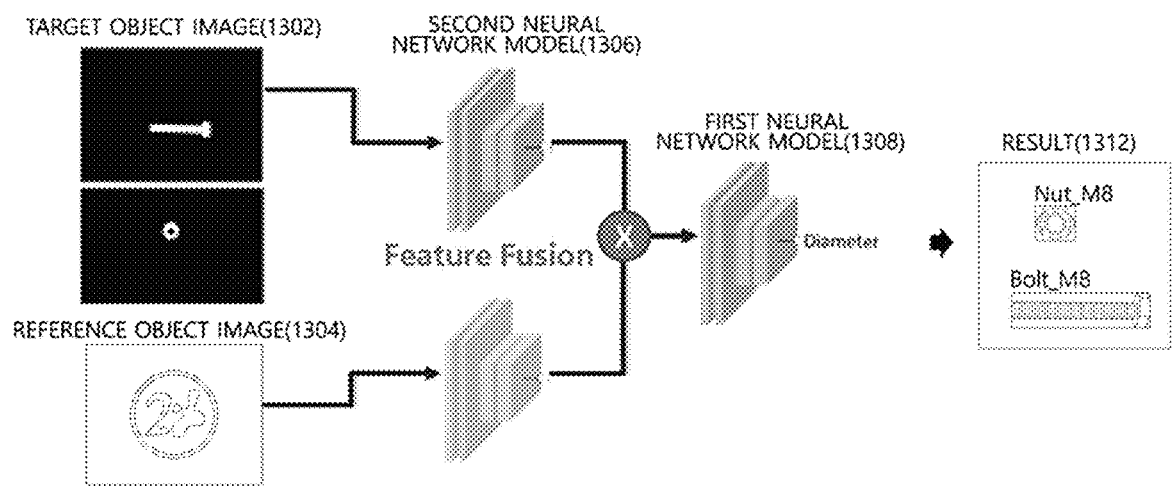
FIG. 13 is a diagram showing a process in which an electronic device fuses a target object feature and a reference object feature on the basis of feature units according to another exemplary embodiment.

FIG. 13 is a diagram showing a process in which an electronic device fuses a target object feature and a reference object feature on the basis of feature units according to another exemplary embodiment.

The process of FIG. 12 in which the electronic device 1000 identifies size of a measurement target object will be described with reference to FIG. 13 focusing on a fusion operation. For example, the electronic device 1000 may acquire a target object image 1302 and a reference object image 1304 and input the acquired target object image 1302 and reference object image 1304 to a second neural network model 1306 to acquire a target object feature and a reference object feature, each of which is output from the second neural network model 1306.

The electronic device 1000 according to the present disclosure may fuse the target object feature and the reference object feature output from the second neural network model by executing a feature fusion algorithm for fusing the target object feature and the reference object feature at a feature level. The feature fusion algorithm executed by the electronic device 1000 may include an algorithm for the above-described element-wise addition or concatenation.

The electronic device 1000 may acquire size information of a measurement target object as a result 1312 by inputting the target object feature and the reference object feature fused at the feature level to a first neural network model.

As described above, to measure size of a measurement target object in a target object image, the electronic device 1000 according to the present disclosure may fuse reference object information and target object information at various levels. The electronic device 1000 according to the present disclosure may accurately identify size of a target object image by inputting a result of at least one of image fusion at an image level, image fusion at an output level of a neural network layer, and fusion at a level of features output from a neural network layer to a first neural network model.

Figure 14:
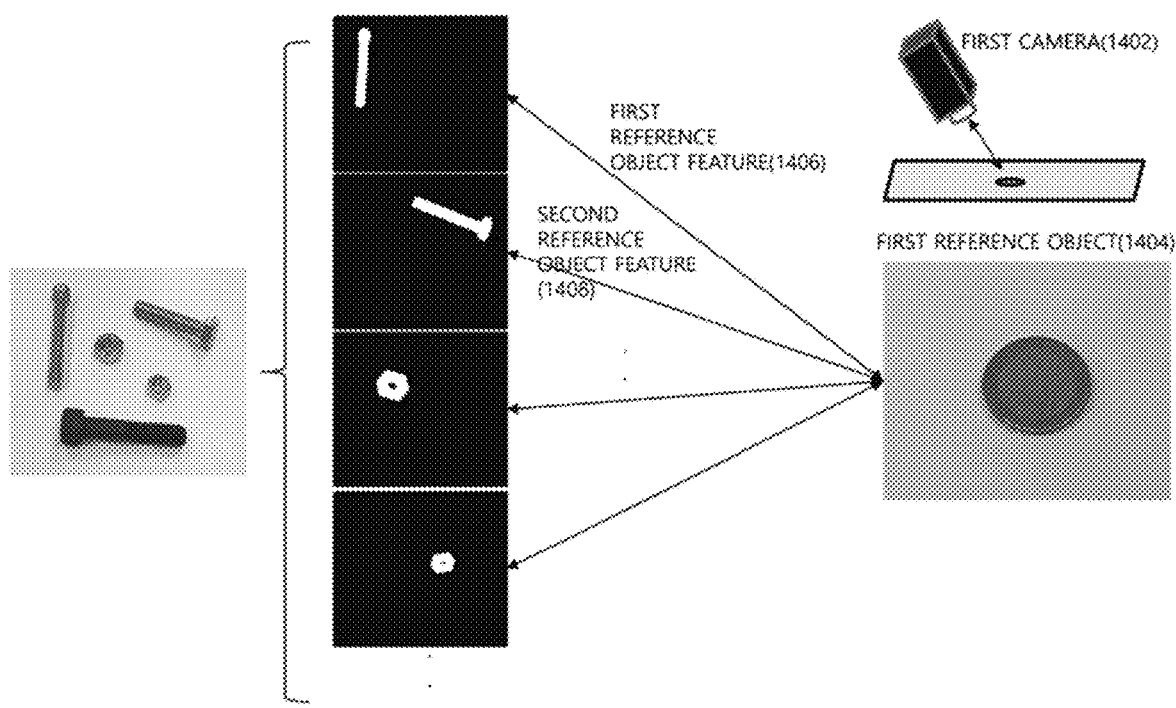
FIG. 14 is a diagram illustrating a process in which an electronic device measures size of a target object using a first neural network according to an exemplary embodiment.

FIG. 14 is a diagram illustrating a process in which an electronic device measures size of a target object using a first neural network according to an exemplary embodiment.

According to an exemplary embodiment, the electronic device 1000 may compare a first reference object 1404 with each target object image using a first neural network model. For example, the electronic device 1000 may acquire a reference object image by imaging the first reference object 1404 through a first camera 1402 and determine a first reference object feature 1406, a second reference object feature 1408, etc. by comparing the acquired reference object image with each target object image including various measurement target objects.

Figure 15:
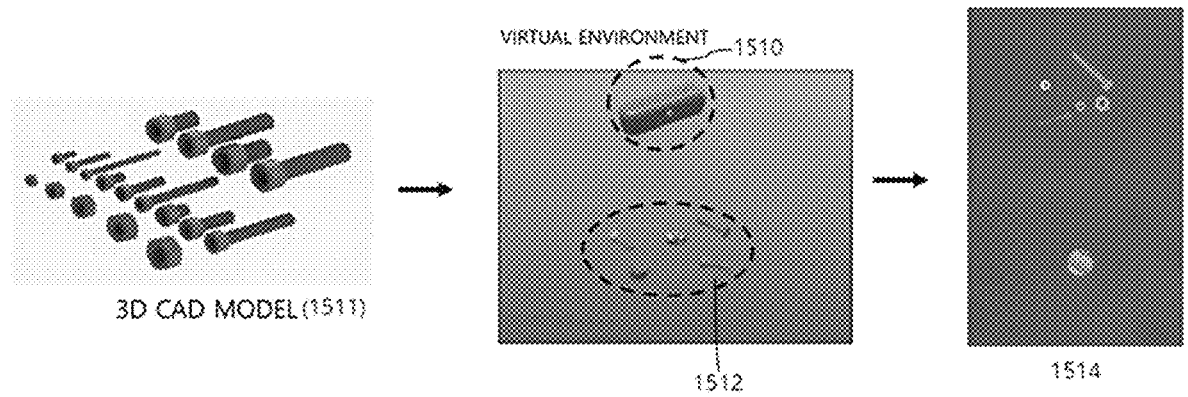
FIG. 15 is a diagram illustrating training data which is generated by an electronic device to train a neural network model according to an exemplary embodiment.

FIG. 15 is a diagram illustrating training data which is generated by an electronic device to train a neural network model according to an exemplary embodiment.

Referring to FIG. 15, training data 1514 which is used by the electronic device 1000 to train a first neural network model and a second neural network model is shown.

According to an exemplary embodiment, the electronic device 1000 may acquire a preset three-dimensional (3D) computer aided design (CAD) model 1511 and a camera characteristic model 1510 including a preset camera characteristic parameter in a virtual environment in which a measurement target object and a reference object may be virtually imaged and image various types of measurement target objects 1512 shown in the 3D CAD model 1511 through the camera characteristic model 1510 to generate training data 1514. According to an exemplary embodiment, the electronic device 1000 may image the various types of measurement target objects 1512 shown in the 3D CAD model 1511 so that the training data 1514 may be generated to further reflect an object image which is a base.

While a surrounding environment (light intensity, lighting, etc.) and an aperture change are all taken into consideration in the case of collecting data through an actual camera, the electronic device 1000 according to the present disclosure collects data using the camera characteristic model 1510 and the 3D CAD model 1511 in a virtual environment. Accordingly, it is possible to collect data on a desired measurement target object.

Also, the electronic device 1000 according to the present disclosure can generate training data which is robust to various variable surrounding elements by randomly changing various types of domain information. According to an exemplary embodiment, domain information is texture information and may include information on how light is reflected by an object. According to an exemplary embodiment, domain information may vary according to a path along which light is reflected by an object.

The electronic device 1000 according to the present disclosure may apply the 3D CAD model 1511 and the camera characteristic model 1510 into a virtual environment and then image a plurality of measurement target objects shown in the 3D CAD model 1511 through the camera characteristic model 1510. In particular, every time a 3D CAD model is imaged in a virtual environment through a camera characteristic model, the electronic device 1000 according to the present disclosure can generate training data robust to various variable surrounding elements by randomly changing domain information. The electronic device 1000 may train a first neural network model and a second neural network model on the basis of training data generated according to the above-described method.

Figure 16:
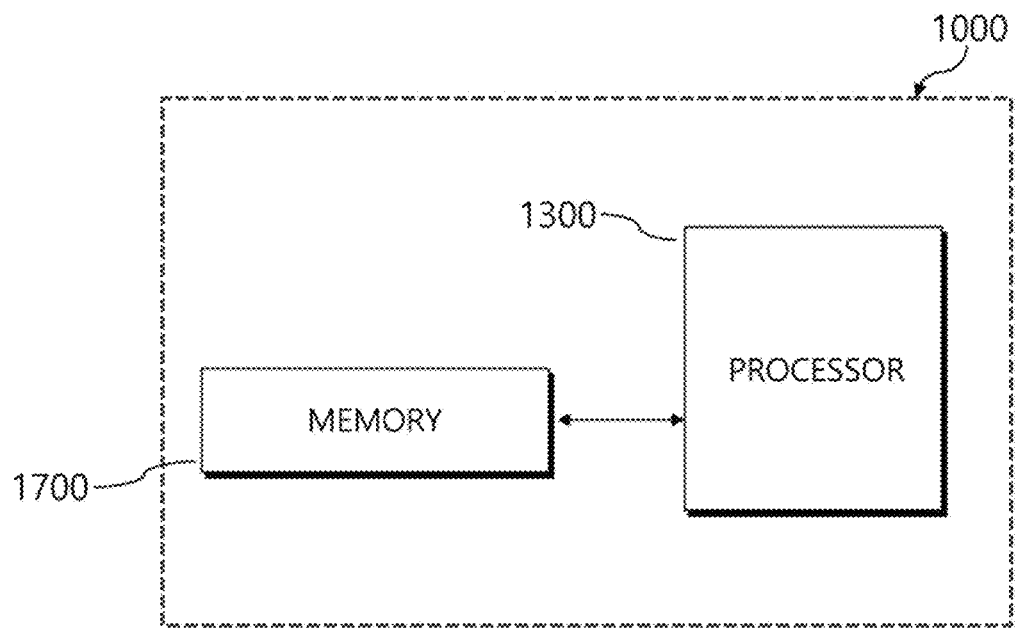
FIG. 16 is a block diagram of an electronic device according to an exemplary embodiment.

FIG. 16 is a block diagram of an electronic device according to an exemplary embodiment.

Figure 17:
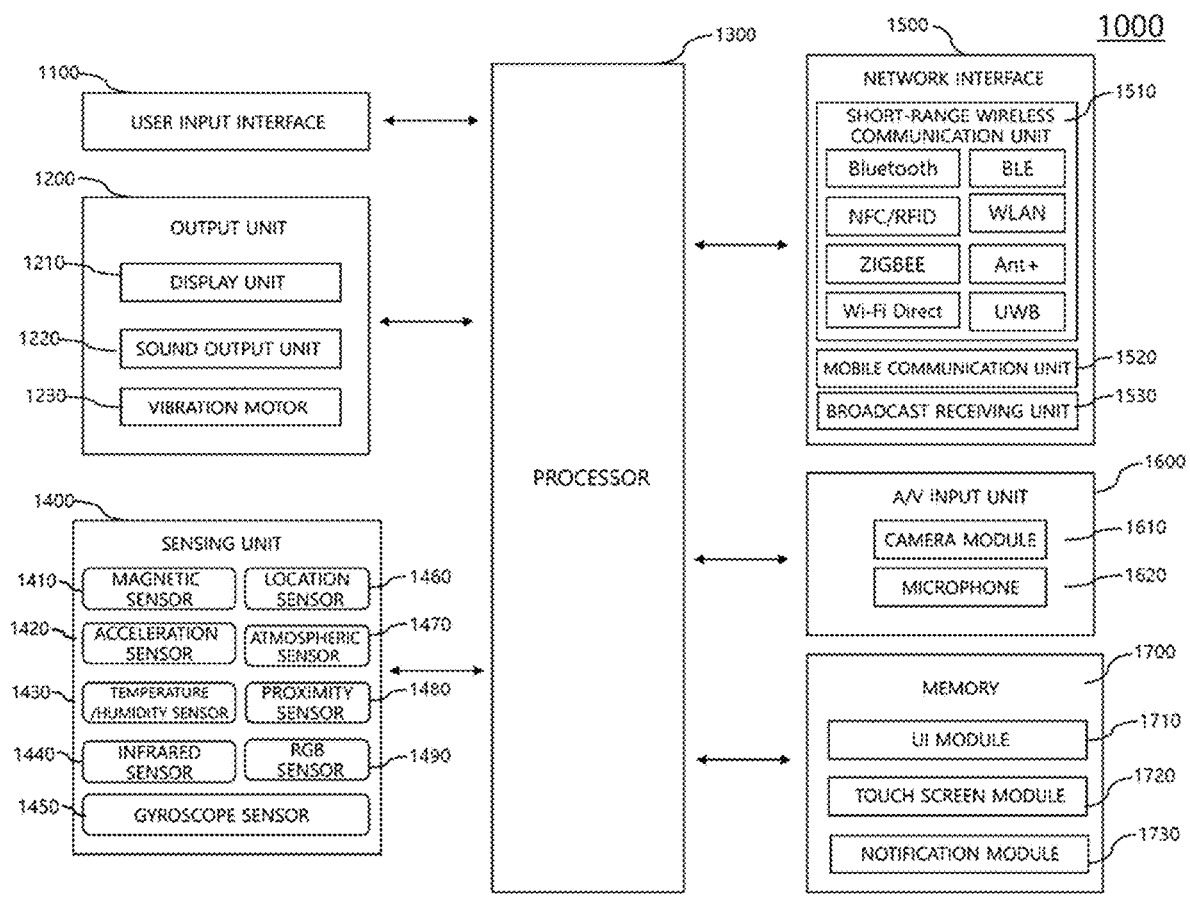
FIG. 17 is a block diagram of an electronic device according to another exemplary embodiment.

FIG. 17 is a block diagram of an electronic device according to another exemplary embodiment.

As shown in FIG. 16, the electronic device 1000 according to the exemplary embodiment may include a processor 1300 and a memory 1700. However, all elements shown in the drawing are not essential. The electronic device 1000 may be implemented as more or fewer elements than the elements shown in the drawing.

For example, as shown in FIG. 17, the electronic device 1000 may include a user input interface 1100, an output unit 1200, a sensing unit 1400, a network interface 1500, an audio/video (A/V) input unit 1600, and a memory 1700 in addition to the processor 1300 and the memory 1700.

The user input interface 1100 is a means for a user to input data for controlling the electronic device 1000. For example, the user input unit 1100 may be a key pad, a dome switch, a touch pad (a capacitive overlay type, a resistive overlay type, an infrared beam type, a surface acoustic wave type, an integral strain gauge type, a piezoelectric type, etc.), a jog wheel, a jog switch, or the like, but the user input unit 1100 is not limited thereto.

The user input interface 1100 may receive at least one user input for the electronic device 1000 to identify information on a measurement target object.

The output unit 1200 may output an audio signal, a video signal, or a vibration signal and include a display unit 1210, a sound output unit 1220, and a vibration motor 1230.

The display unit 1210 includes a screen for displaying or outputting information processed by the electronic device 1000. Also, the screen may display an image. For example, at least a part of the screen may display a target object image acquired by imaging the measurement target object and a reference object image acquired by imaging a reference object.

The sound output unit 1220 outputs audio data received from the network interface 1500 or stored in the memory 1700. Also, the sound output unit 1220 outputs a sound signal related to a function (e.g., a call signal ring tone, a message ring tone, and a notification tone) performed by the electronic device 1000.

The processor 1300 generally controls overall operations of the electronic device 1000. For example, the processor 1300 may control the user input interface 1100, the output unit 1200, the sensing unit 1400, the network interface 1500, the A/V input unit 1600, etc. overall by executing programs stored in the memory 1700. Also, the processor 1300 may perform the functions of the electronic device 1000 illustrated in FIGS. 1 to 15 by executing the programs stored in the memory 1700.

According to an exemplary embodiment, the processor 1300 may image the reference object, which is a reference for identifying size of the measurement target object, to acquire the reference object image, image the measurement target object to acquire the target object image, fuse the acquired reference object image and target object image, and input the fused reference object image and target object image to a first neural network model to acquire size information of the measurement target object from the first neural network model.

According to an exemplary embodiment, the processor 1300 may acquire a target object mask image, which is generated on the basis of a target object area in the target object image, from a second neural network model by inputting the target object image to the second neural network model and fuse the target object mask image and the reference object image.

According to an exemplary embodiment, the processor 1300 may acquire a reference object feature from the second neural network model by inputting the reference object image to the second neural network model and acquire size information of the measurement target object by inputting the acquired reference object feature and the acquired target object image to the first neural network model.

The sensing unit 1400 may sense a state of the electronic device 1000 or a state of surroundings of the electronic device 1000 and transfer sensing information to the processor 1300. The sensing unit 1400 may be used to generate some of specification information of the electronic device 1000, state information of the electronic device 1000, surrounding information of the electronic device 1000, state information of the user, and the user's history of using the electronic device 1000.

The sensing unit 1400 may include at least one of a magnetic sensor 1410, an acceleration sensor 1420, a temperature/humidity sensor 1430, an infrared sensor 1440, a gyroscope sensor 1450, a location sensor (e.g., Global Positioning System (GPS)) 1460, an atmospheric sensor 1470, a proximity sensor 1480, and a red green blue (RGB) sensor (i.e., illuminance sensor) 1490, but the sensing unit 1400 is not limited thereto. The function of each of the sensors may be intuitively derived from the name by those of ordinary skill in the art, and a detailed description thereof is omitted.

The network interface 1500 may include at least one element which allows the electronic device 1000 to communicate with another device (not shown) and the server 2000. The other device (not shown) may be a computing device like the electronic device 1000 or a sensing device but is not limited thereto. For example, the network interface 1500 may include a short-range wireless communication unit 1510, a mobile communication unit 1520, and a broadcast receiving unit 1530.

The short-range wireless communication unit 1510 may include a Bluetooth communication unit, a Bluetooth Low Energy (BLE) communication unit, a near field communication (NFC) unit, a wireless local area network (WLAN) (i.e., Wi-Fi) communication unit, a ZigBee communication unit, an infrared data association (IrDA) communication unit, a Wi-Fi direct (WFD) communication unit, an ultra-wideband (UWB) communication unit, etc., but the short-range wireless communication unit 1510 is not limited thereto.

The mobile communication unit 1520 exchanges wireless signals with at least one of a base station, an external terminal, and a server in a mobile communication network. Here, the wireless signals may include various forms of data according to transmission and reception of voice call signals, video call signals, or text or multimedia messages.

The broadcast receiving unit 1530 externally receives a broadcast signal and/or broadcast-related information through a broadcast channel. The broadcast channel may include a satellite channel and a terrestrial channel. According to an implementation example, the electronic device 1000 may not include the broadcast receiving unit 1530. Also, the network interface 1500 may acquire the target object image or the reference object image from an external device including a camera device or the server 2000. According to an exemplary embodiment, the network interface 1500 may transmit information on the measurement target object identified by the electronic device 1000 to the server 2000 or an external device.

The A/V input unit 1600 is intended to input an audio signal or a video signal and may include a camera module 1610, a microphone 1620, and the like. The camera module 1610 may acquire a video frame, such as a still image or a video, through an image sensor in a video call mode or an imaging mode. An image captured through the image sensor may be processed through the processor 1300 or an additional image processing unit (not shown).

The microphone 1620 receives and processes an external sound signal into electrical voice data. For example, the microphone 1620 may receive a sound signal from an external device or the user. The microphone 1620 may receive a voice input of the user. The microphone 1620 may use various noise removal algorithms for removing noise which occurs in a process of receiving an external sound signal.

The memory 1700 may store a program for processing and control of the processor 1300 and data which is input to or output from the electronic device 1000. Also, the memory 1700 may store a result of searching for the target object image, the reference object image, and images stored in the memory 1700.

Also, the memory 1700 may store information on at least one neural network model used by the electronic device 1000. For example, the memory 1700 may store weight values for layers and nodes in the at least one neural network model and connection strength between the layers. The electronic device 1000 may further store training data which is generated by the electronic device 1000 to train a neural network model. Also, the memory 1700 may further store a 3D CAD model and a camera characteristic model for generating training data.

The memory 1700 may include at least one type of storage medium among a flash memory type memory, hard disk type memory, a multimedia card micro type memory, a card type memory (e.g., a Secure Digital (SD) memory or an eXtreme Digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the memory 1700 may be classified into a plurality of modules by function. For example, the programs may be classified into a user interface (UI) module 1710, a touch screen module 1720, a notification module 1730, and the like.

The UI module 1710 may provide a specialized UI, a graphics user interface (GUI), etc. interoperating with the electronic device 1000 according to applications. The touch screen module 1720 may detect the user's touch gesture on a touch screen and transfer information on the touch gesture to the processor 1300. The touch screen module 1720 according to some exemplary embodiments may recognize and analyze a touch code. The touch screen module 1720 may be configured as separate hardware including a controller.

The notification module 1730 may generate a signal for notifying a user of the occurrence of an event. Examples of an event which occurs in the electronic device 1000 are call signal receiving, message receiving, key signal inputting, schedule notification, and the like. The notification module 1730 may output a notification signal in the form of a video signal through the display unit 1210, output a notification signal in the form of an audio signal through the sound output unit 1220, and output a notification signal in the form of a vibration signal through the vibration motor 1230.

According to an exemplary embodiment, it is possible to effectively identify size of a measurement target object.

According to an exemplary embodiment, it is possible to simply identify size of a measurement target object on the basis of an estimated position of a camera without imaging a reference object together.

The method of identifying size of a measurement target object by an electronic device according to an exemplary embodiment may be implemented in the form of a program instruction executable by various computing units and recorded on a computer-readable recording medium. The computer-readable recording medium may include program commands, data files, data structures, etc. alone or in combination. The program commands recorded on the medium may be those specially designed and configured for the present disclosure or may be those publicly known and available to those of ordinary skill in the field of computer software.

Examples of the computer-readable recording medium include magnetic media, such as hard disks, floppy disks, and magnetic tapes, optical recording media, such as compact disc (CD)-ROMs and digital versatile discs (DVDs), magneto-optical media, such as floptical disks, and hardware devices such as ROMs, RAMs, and flash memories specially configured to store and execute program commands Examples of program commands include machine language codes made by a compiler and high-level language codes executable by a computer using an interpreter and the like.

Some of the exemplary embodiments may be implemented in the form of a recording medium which includes instructions executable by a computer such as program modules executed by computers. The computer-readable medium may include any available medium that may be accessed by computers and may include all volatile and non-volatile media and detachable and non-detachable media. Also, the computer-readable medium may include both a computer storage medium and a communication medium. The computer storage medium may include all volatile and non-volatile media and detachable and non-detachable media which are based on any methods or technologies for storing information including computer-readable instructions, data structure, program modules, or other data. The communication medium may typically include computer-readable instructions, data structures, program modules, other data of modified data signals, such as carrier waves, other transmission mechanisms, or any information transmission media. Also, some of the exemplary embodiments may be implemented as a computer program or computer program product including instructions executable by a computer.

Although the exemplary embodiments of the present disclosure have been described in detail, the scope of the present disclosure is not limited thereto, and various modifications and alterations made by those of ordinary skill in the art using the basic concept defined in the following claims fall within the scope of the present disclosure.

What is claimed is:

1. A method of identifying a size of a measurement target object by an electronic device having at least one camera, a processor, and a memory, the method comprising:
    capturing, by the at least one camera, a reference object image of a reference object, which is a reference for identifying the size of the measurement target object;
    capturing, by the at least one camera, a target object image of the measurement target object;
    inputting, by the processor, the target object image to a first Convolutional Neural Network (CNN)-based model;
    acquiring, by the processor, a target object mask image generated by the first CNN-based model on the basis of a target object area in the target object image;
    fusing, by the processor, the target object mask image and the reference object image, to generate a fused image;
    inputting, by the processor, the fused image to a second CNN-based neural network, which is different from the first CNN-based model;
    acquiring, by the processor, size information of the measurement target object from the second CNN-based neural network.

2. The method of claim 1, wherein the first CNN-based model is configured to identify an object area including each of the at least one measurement target object in the target object image, which is input to the first CNN-based model and includes the at least one measurement target object, generate an object box including the object area, identify a type of the measurement target object represented by the object box, and binarize an image input to the first CNN-based model on the basis of the object area to generate the target object mask image.

3. The method of claim 2, wherein the second CNN-based neural network is configured to acquire the target object mask image and the reference object image, compare the acquired target object mask image and the acquired reference object image, and output information on the type and size of the measurement target object, which is represented by the object box in the target object image including the measurement target object, on the basis of a comparison result.

4. The method of claim 1, wherein the first CNN-based model and the second CNN-based neural network are trained in advance on the basis of training data which is generated using a preset computer aided design (CAD) model and a camera characteristic model including a preset camera characteristic parameter in a virtual environment for virtually imaging the measurement target object and the reference object.

5. The method of claim 4, wherein the training data is generated using the CAD model and the camera characteristic model while changing domain information which varies on the basis of a path along which virtual light is reflected by the measurement target object or the reference object.

6. The method of claim 1, further comprising acquiring information on a type of the measurement target object and an area of the measurement target object in the target object image from the second CNN-based neural network.

* * * * *